(12) United States Patent
Lee et al.

(10) Patent No.: US 9,635,631 B2
(45) Date of Patent: Apr. 25, 2017

(54) METHOD AND SYSTEM FOR SYNCHRONIZING TIME INFORMATION IN AD HOC NETWORK

(71) Applicant: Chung-Ang University Industry-Academy Cooperation Foundation, Seoul (KR)

(72) Inventors: Jung-Ryun Lee, Seoul (KR); Yong-Soo Cho, Seoul (KR); Yun-Jae Shin, Seoul (KR); Un-Ha Kim, Gyeonggi-Do (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 0 days.

(21) Appl. No.: 14/701,258

(22) Filed: Jun. 29, 2015

(65) Prior Publication Data

US 2016/0007309 A1    Jan. 7, 2016

Related U.S. Application Data

(63) Continuation of application No. PCT/KR2013/004732, filed on May 30, 2013.

(30) Foreign Application Priority Data

Oct. 31, 2012 (KR) ........................ 10-2012-0122579

(51) Int. Cl.
*H04W 56/00* (2009.01)
*H04B 7/212* (2006.01)
(Continued)

(52) U.S. Cl.
CPC ......... *H04W 56/002* (2013.01); *H04B 7/2126* (2013.01); *H04B 7/2678* (2013.01);
(Continued)

(58) Field of Classification Search
None
See application file for complete search history.

(56) References Cited

U.S. PATENT DOCUMENTS

| 2004/0087269 | A1* | 5/2004 | Edge | H04B 7/2678 455/11.1 |
|---|---|---|---|---|
| 2005/0226207 | A1* | 10/2005 | Sharma | H04W 56/001 370/350 |

(Continued)

FOREIGN PATENT DOCUMENTS

| KR | 10-2009-0112936 A | 10/2009 |
|---|---|---|
| KR | 10-2010-0007765 A | 1/2010 |

(Continued)

*Primary Examiner* — Candal Elpenord
(74) *Attorney, Agent, or Firm* — Mintz Levin Cohn Ferris Glovsky and Popeo, P.C.; Kongsik Kim; Jonathon Western (57) ABSTRACT

A method and a system for synchronizing time information in an ad-hoc network are disclosed. According to the present invention, provided is a method for synchronizing time information in an ad-hoc network as a method by which a plurality of nodes included in an ad-hoc network synchronize a time, the method comprising the steps of: transmitting, by a first node, time information obtained by correcting an initial time using a first self-correcting value at an nth beacon interval, wherein the first self-correcting value is a self-correcting value or a local averaging value at an (n−1)th beacon interval; and correcting, by a second node which has received the time information from the first node at the nth beacon interval, time information by calculating a second self-correcting value and a local average value, wherein the first self-correcting value is either the self-correcting value or the local averaging value calculated at the (n−1)th beacon interval, and the local averaging value of the second node is an averaging value of time information of one or more neighboring nodes of the second node.

11 Claims, 5 Drawing Sheets

(51) Int. Cl.
*H04B 7/26* (2006.01)
*H04W 84/18* (2009.01)

(52) U.S. Cl.
CPC .... *H04W 56/0015* (2013.01); *H04W 56/0075* (2013.01); *H04W 84/18* (2013.01)

(56) References Cited

U.S. PATENT DOCUMENTS

| | | | | |
|---|---|---|---|---|
| 2007/0008947 A1* | 1/2007 | Belcea | ............... | H04W 56/0065 370/350 |
| 2009/0016321 A1* | 1/2009 | Li | ..................... | H04W 56/0015 370/350 |
| 2010/0014460 A1* | 1/2010 | Shin | ..................... | H04J 3/0679 370/328 |
| 2012/0127977 A1 | 5/2012 | Copeland et al. | | |
| 2013/0070751 A1* | 3/2013 | Atwal | ................. | H04W 56/001 370/350 |

FOREIGN PATENT DOCUMENTS

| | | | |
|---|---|---|---|
| KR | 10-1030201 B1 | 4/2011 | |
| KR | 10-1165142 B1 | 7/2012 | |

* cited by examiner

METHOD AND SYSTEM FOR SYNCHRONIZING TIME INFORMATION IN AD HOC NETWORK

CROSSE REFERENCE TO RELATED APPLICATION

This application is a continuation of International Application No. PCT/KR2013/004732 filed on May 30, 2013, which claims priority to Korean Application No. 10-2012-0122579 filed on Oct. 31, 2012. The applications are incorporated herein by reference.

TECHNICAL FIELD

The present invention relates to a method and a system for synchronizing time information in an ad-hoc network, and more particularly, to a method and a system for synchronizing time information between nodes in a distributed processing manner in a multi-hop ad-hoc network.

BACKGROUND ART

An ad-hoc network is a network autonomously configured with communicable nodes without any fixed base station (BS) or access point (AP). In the ad-hoc network, since most nodes support mobility, each node does not receive a continuous energy supply but uses a battery with a limited capacity as an energy source. Particularly, among several main factors that nodes use energy, energy consumed in communication has a great deal of weight.

As a representative method for reducing energy consumed in communication, there is a method in which when communication between nodes is necessary, the nodes wake up in a communicable state, and on the contrary, when nodes are in a standby state in which communication between the nodes is unnecessary, the nodes enter into a sleep state, thereby reducing energy consumption.

However, in the method, it is very important that all nodes existing in a network simultaneously wake up and enter into the sleep state while having the same time information, and a technique for synchronizing time between nodes is required.

A time synchronization function (TSF) algorithm described in the 802.11 standards is used as a representative method of time synchronization protocols, which is proposed in a conventional art. In the TSF algorithm, when nodes exchange time information with each other by transmitting/receiving beacon signals between the nodes, if a beacon signal received by a node has time information earlier than time information of the node, synchronization is performed while correcting the time information of the node to the early time information. If a beacon signal received by a node has time information later than time information of the node, synchronization is not performed.

In the conventional art, its procedure is simple, and thus time synchronization is well performed when a small number of nodes exist in a network. However, in a network having a large number of nodes, since the number of nodes competing in a beacon contention window increases, the opportunity that a node having early time information can transmit/receive its own beacon signals is reduced. Hence, there is a problem in performing time synchronization of the entire network.

SUMMARY

An embodiment of the present invention is directed to a method and a system for synchronizing time information in an ad-hoc network, which can effectively perform time synchronization even in a network having a large number of nodes.

According to an aspect of the present invention, there is provided a method for synchronizing, by a plurality of nodes included in an ad-hoc network, time information in the ad-hoc network, the method including: transmitting, by a first node, time information corrected using an initial time and a first self-correcting value at an nth beacon interval, wherein the first self-correcting value is a local averaging value at a previous beacon interval; and correcting, by a second node which has received the time information from the first node at the nth beacon interval, its own time information by calculating a second self-correcting value and a local averaging value, wherein the local averaging value of the second node is an averaging value of time information of one or more neighboring node of the second node.

When the first node receives time information from one or more neighboring nodes at an (n+1)th beacon interval, the first node may determine the first self-correcting value as a self-correcting value at the (n+1)th beacon interval, and correct its own time information by using a local averaging value calculated using an averaging value of the time information received from the one or more neighboring nodes and the self-correcting value at the (n+1)th beacon interval.

When the second node transmits its own time information to the one or more neighboring nodes at the (n+1)th beacon interval, the second node may correct its own time information by using the local averaging value at the nth beacon interval as the self-correcting value at the (n+1)th beacon interval.

When an initial time of the second node is earlier than a time(s) of the one or more neighboring nodes, the second node may correct its own time information by subtracting the second self-correcting value and the local averaging value at the nth beacon interval from the initial time at the nth beacon interval.

When the initial time of the second node is later than the time(s) of the one or more neighboring nodes, the second node may correct its own time information by adding up the second self-correcting value and the local averaging value at the nth beacon interval to the initial time at the nth beacon interval.

The local averaging value of the second node may be calculated according to the following Equation:

$$\Delta_i^{avg}(n) = \frac{\left(\left(\sum_{(j \in N(i,n))} \tilde{T}_j^{sc}(n)\right) + \tilde{T}_i^{sc}(n)\right)}{|N(i,n)| + 1}.$$

Equation 1

Here, N is a number of neighboring nodes, i is an identifier of the second node, j is an identifier of a neighboring node, and TSC is a corrected time.

According to another aspect of the present invention, there is provided a method for synchronizing, by a plurality of nodes included in an ad-hoc network, time information in the ad-hoc network, the method including: receiving, by a node, a beacon signal including time information from one or more neighboring nodes at an nth beacon interval; determining a local averaging value at a previous beacon interval as a self-correcting value at the nth beacon interval; calculating a local averaging value by using an averaging value of the time information of the one or more neighboring nodes;

and correcting its own time information by using the self-correcting value, the local averaging value, and an initial time.

According to still another aspect of the present invention, there is provided a method for synchronizing, by a plurality of nodes included in an ad-hoc network, time information in the ad-hoc network, the method including: receiving, by a node, a beacon signal including time information from one or more neighboring nodes at an nth beacon interval; calculating a self-correcting value by using a difference between an initial time and a corrected time at a previous beacon interval; calculating a local averaging value by using an averaging value of the time information of the one or more neighboring nodes; and correcting its own time information by using the self-correcting value, the local averaging value, and the initial time.

According to yet another aspect of the present invention, there is provided a computer-readable recording medium for executing the method.

According to still yet another aspect of the present invention, there is provided a system for synchronizing time information in an ad-hoc network, the system including: a first node configured to transmit time information corrected using an initial time and a first self-correcting value at an nth beacon interval, wherein the first self-correcting value is a local averaging value at a previous beacon interval; and a second node configured to correct its own time information by receiving the time information from the first node at the nth beacon interval and calculating a second self-correcting value and a local averaging value, wherein the first self-correcting value is one of a self-correcting value and a local averaging value, which are calculated at an (n−1)th beacon interval, and wherein the local averaging value of the second node is an averaging value of time information of one or more neighboring nodes of the second node.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

According to the present invention, a synchronization method through distributed processing is used, and hence nodes do not compete in a beacon contention window. Further, a method is used in which a node receives time information of neighboring nodes and corrects its own time information by a difference between the time information and an averaging value of the received time information. Hence, it is possible to efficiently synchronize time information between nodes.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 1:
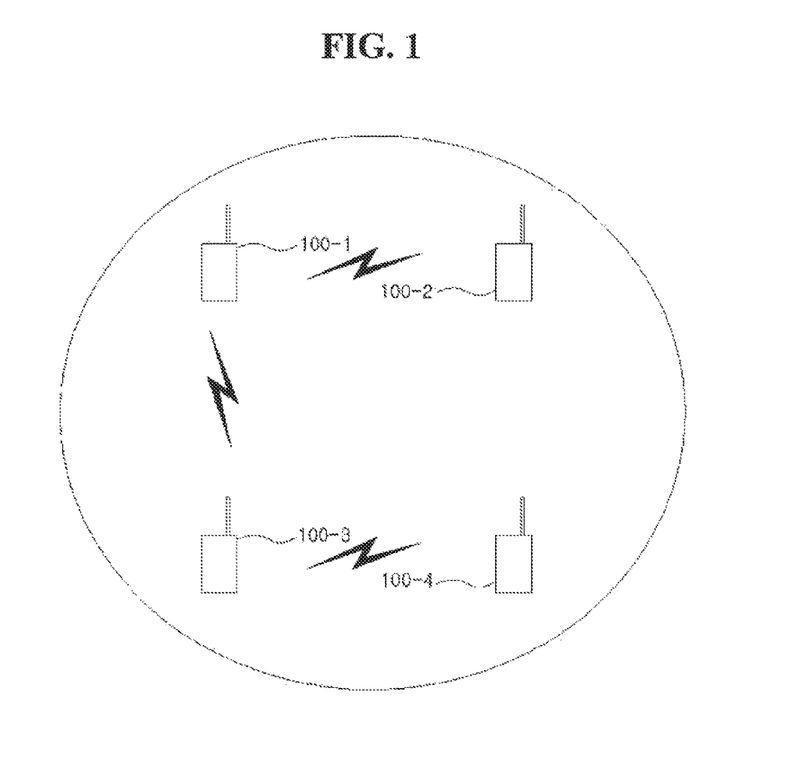
FIG. 1 is a schematic view illustrating an ad-hoc network system according to the present invention.

FIG. 1 is a schematic view illustrating an ad-hoc network system according to the present invention.

As shown in FIG. 1, the ad-hoc network according to the present invention may include a plurality of nodes 100-$n$. When the state of the plurality of nodes 100-$n$ is changed from a sleep state to a wake-up state, the plurality of nodes 100$n$ set communication links therebetween.

Figure 2:
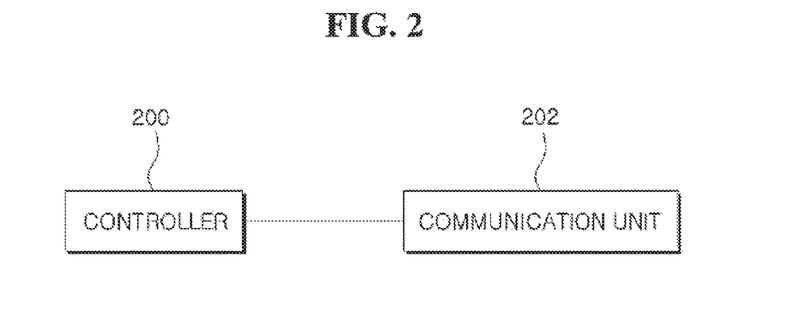
FIG. 2 is a view illustrating a configuration of a node according to an embodiment of the present invention.

As shown in FIG. 2, the node 100 according to the present invention may include a controller 200 and a communication unit 202.

When a beacon signal including time information is transmitted/received through the communication unit 202, the controller 200 corrects the time information by calculating a self-correcting (SC) value or local averaging value using the time information.

According to an exemplary embodiment of the present invention, a node receiving a beacon signal simultaneously performs calculation of a self-correcting value and calculation of a local averaging value, and a node transmitting a beacon signal transmits the beacon signal including time information to which the self-correcting value is reflected.

According to the present invention, the calculation of the self-correcting value or the calculation of the local averaging value is performed at every beacon interval, and each node corrects time information by reflecting a local averaging value calculated at a previous beacon interval as a self-correcting value at a current point of time.

Preferably, the calculation of a local averaging value may be performed at every interval where a corresponding node receives a beacon signal.

Hereinafter, a process of synchronizing time information according to the present invention will be described in detail with reference to equations.

According to the present invention, a time model of each node may be expressed as shown in Equation 1.

$$T(t) = \beta * t + \epsilon(t) + T(0) \qquad \text{Equation 1}$$

Here, $\beta$ is a skew time, t is a current time, $\epsilon(t)$ is noise with respect to time, and $T(0)$ is an initial draft time (initial time of a clock).

The time model of each node may be expressed as shown in Equation 2 by introducing a beacon interval into Equation 1.

$$\tilde{T}_i^{sc} = \tilde{T}_i^{ini}(n) + \Delta_i^{sc}(n) \qquad \text{Equation 2}$$

Here, n is a beacon interval sequence.

As shown in Equation 3, $\Delta_i(n)$ is a value obtained by adding up a self-correcting value of a node using its own time information at a previous beacon interval (nth beacon interval) and a local averaging value using an averaging value of time information of neighboring nodes so as to correct time information at a current point of time ((n+1)th beacon interval).

$$\Delta_i(n) = \Delta_i^{sc}(n) + \Delta_i^{ave}(n) \quad \text{Equation 3}$$

Hereinafter, a process of synchronizing time information of each node according to the present invention will be described in detail with reference to drawings.

Figure 3:
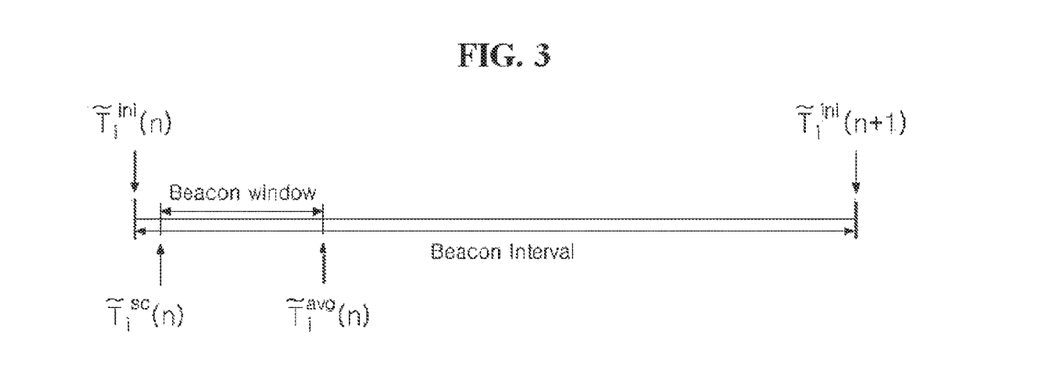
FIG. 3 is a view illustrating time information of node i after calculation of a self-correcting value and time information of the node i after calculation of a local averaging value at an nth beacon interval.
Figure 4:
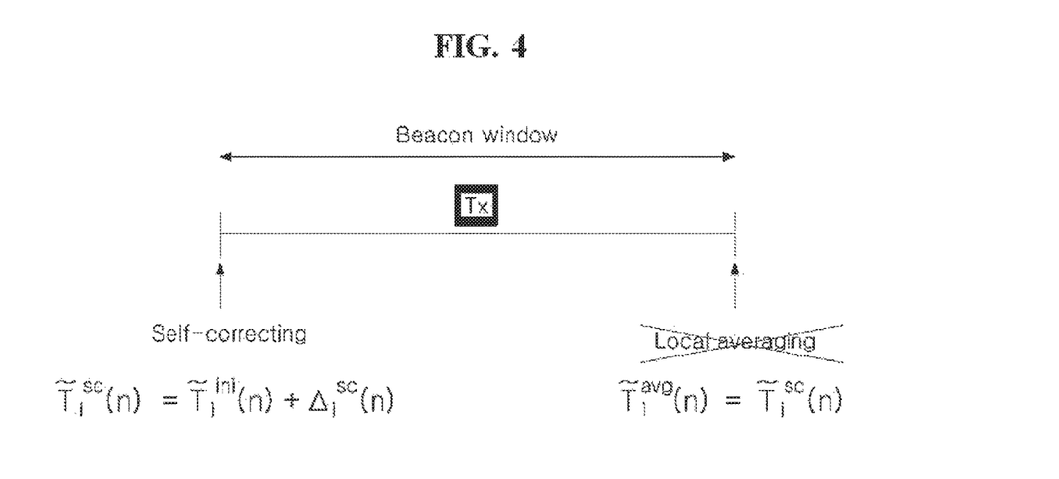
FIG. 4 is a view illustrating a process of correcting time information of a node that transmits a beacon signal including its own time information.
Figure 5:
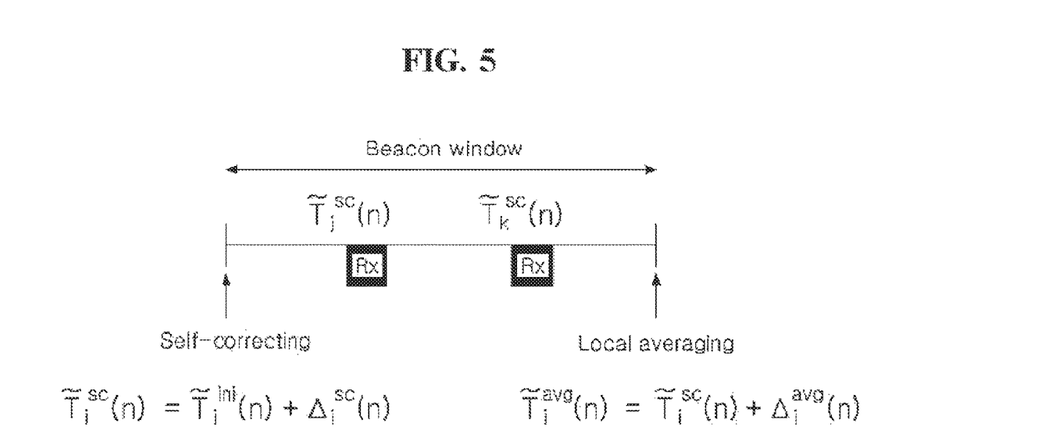
FIG. 5 is a view a process of correcting time information of a node that receives a beacon signal including time information of neighboring nodes.

FIG. 3 is a view illustrating time information of a node i after calculation of a self-correcting value and time information of the node i after calculation of a local averaging value at an nth beacon interval. FIG. 4 is a view illustrating a process of correcting time information of a node that transmits a beacon signal including its own time information. FIG. 5 is a view a process of correcting time information of a node that receives a beacon signal including time information of neighboring nodes.

In FIG. 3, $\tilde{T}_i^{ini}(n)$ is an initial time at an nth beacon interval of a predetermined node i. The node calculates a self-correcting value $\Delta_i^{sc}(n)$ by using its own time information at a previous beacon interval ((n−1)th beacon interval), and adds up the calculated self-correcting value to initial time information as shown in Equation 4.

$$\tilde{T}_i^{sc}(n) = \tilde{T}_i^{ini}(n) + \Delta_i^{sc}(n) \quad \text{Equation 4}$$

In order to evaluate a self-correcting value $\Delta_i^{sc}(n)$ of each of nodes transmitting a beacon signal including time information at the nth beacon interval, the node uses a difference between the time corrected by the self-correcting value at the previous beacon interval and the initial time as shown in Equation 5.

In order to evaluate a self-correcting value of each of nodes which have received the beacon signal, the node uses a difference between the time to which both the local averaging value and the self-correcting value at the previous beacon interval are reflected and the time to which only the self-correcting value is reflected as shown in Equation 6.

$$\Delta_i^{sc}(n) = \tilde{T}_i^{sc}(n-1) - \tilde{T}_i^{ini}(n-1) \quad \text{Equation 5}$$

$$\Delta_i^{sc}(n) = \tilde{T}_i^{avg}(n-1) - \tilde{T}_i^{sc}(n-1) \quad \text{Equation 6}$$

Figure 7:
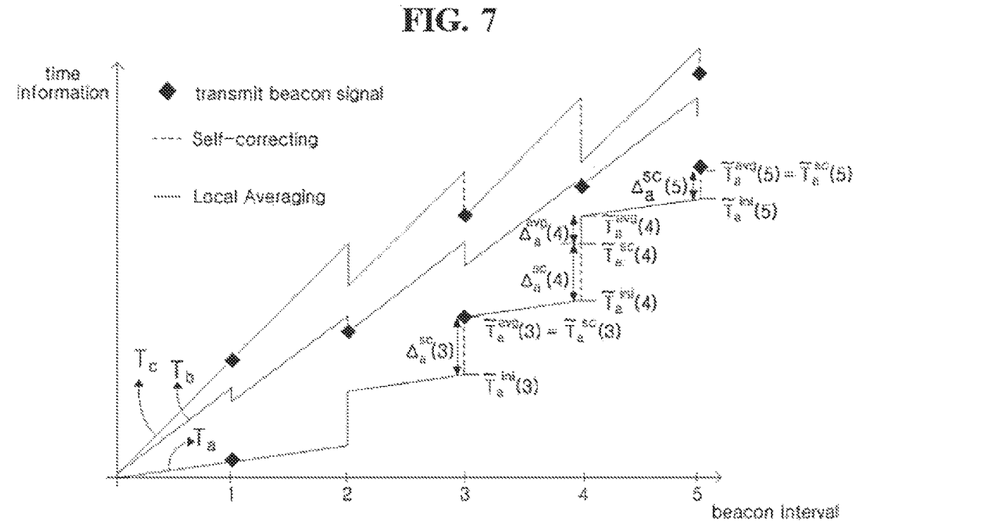
FIG. 7 is a view illustrating a state in which time information is corrected at every beacon interval according to an embodiment of the present invention.

In the present invention, the self-correcting value of the node transmitting the beacon signal may be a local averaging value calculated at the previous beacon interval (see FIG. 7).

Figure 8:
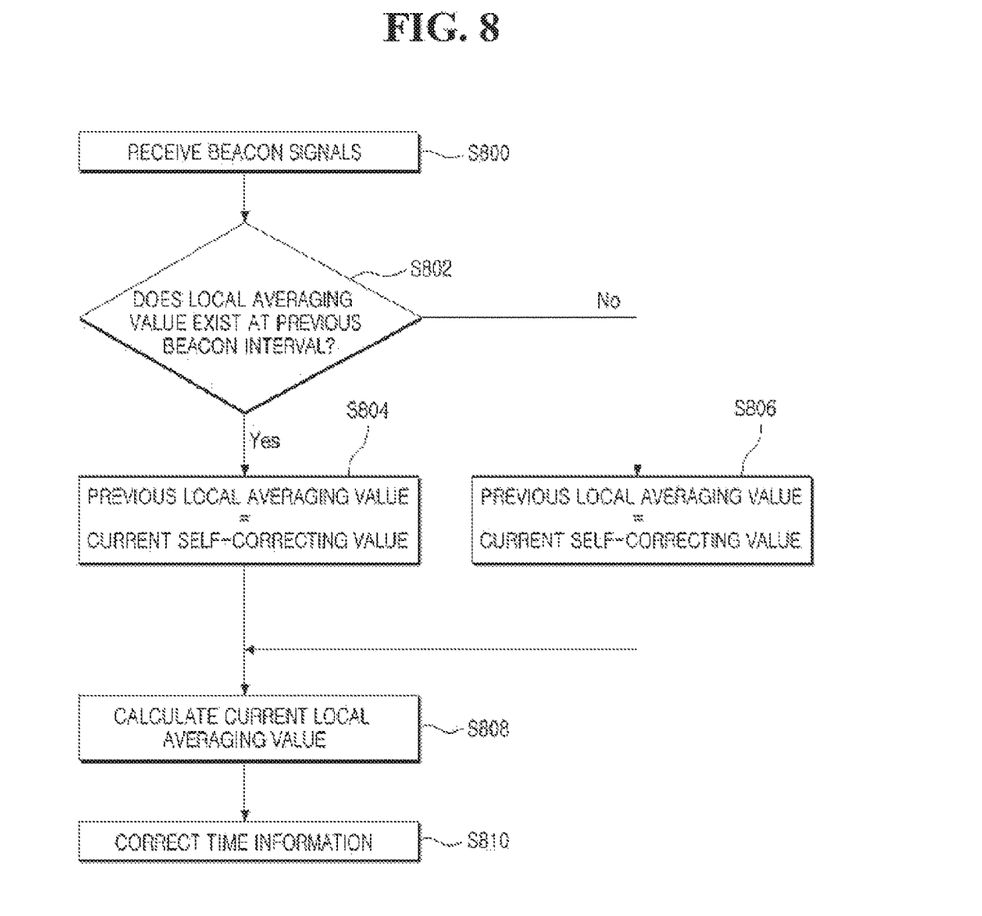
FIG. 8 is a flowchart illustrating a process of correcting time information of a node that receives a beacon signal according to an embodiment of the present invention.

After that, each of all the nodes transmits/receives time information to/from another node. Each of nodes receiving signals evaluates a time-averaging value $\Delta_i^{avg}(n)$ by using an averaging value of time information of neighboring nodes as shown in FIG. 8, and corrects time information by adding up the evaluated value as shown in Equation 7.

$$\tilde{T}_i^{avg}(n) = \tilde{T}_i^{sc}(n) + \Delta_i^{avg}(n) \quad \text{Equation 7}$$

$$\Delta_i^{avg}(n) = \frac{\left(\left(\sum_{(j \in N(i,n))} \tilde{T}_j^{sc}(n)\right) + \tilde{T}_i^{sc}(n)\right)}{|N(i,n)| + 1} \quad \text{Equation 8}$$

Here, N is a number of neighboring nodes, i is an identifier of a second node, j is an identifier of a neighboring node, and $T^{SC}$ is a corrected time.

By repeatedly performing the process described above, the difference in time information between the nodes is reduced as shown in FIG. 7.

Figure 6:
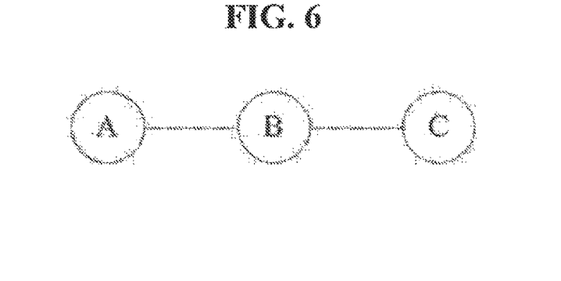
FIG. 6 is a view illustrating a state in which a plurality of nodes are arranged according to an embodiment of the present invention.

FIG. 6 is a view illustrating a state in which a plurality of nodes are arranged according to an embodiment of the present invention. FIG. 7 is a view illustrating a state in which time information is corrected at every beacon interval according to an embodiment of the present invention.

Referring to FIGS. 6 and 7, each of nodes A and C transmits a beacon signal including its own time information to node B connected to the node in the neighborhood of the at a first beacon interval.

By using the transmitted beacon signal, the node B, the node B calculates a local averaging value using an averaging value of time information of nodes located in the neighborhood of the node B as shown in Equation 8, and corrects its own time information using the calculated local averaging value.

Since the node B transmits a beacon signal at a second beacon interval, the node B adds up a self-correcting value at the previous beacon interval to its own time information (an initial time at the second beacon interval) and then transmits the time information to the nodes A and C connected to the node B in the neighborhood of the node B. Each of the nodes A and C also corrects its own time information by using a self-correcting value at the previous beacon interval and a local averaging value using an averaging value of time information of nodes connected to the node in the neighborhood of the node.

Similarly, at beacon intervals from a third beacon interval, a node transmitting time information adds up an initial time at a current beacon interval to its own time information by using a local averaging value at the current beacon interval as a self-correcting value and then transmits the time information to nodes connected to the node at the neighborhood of the node. A node which has received the time information also adds up a self-correcting value to its own time information and then calculates a local averaging value using an averaging value of time information of nodes connected to the node in the neighborhood of the node, thereby adding up the calculated local averaging value to its time information.

As shown in FIG. 7, among nodes receiving/transmitting a beacon signal, the time information of a node having an early time is corrected to decrease, and the time information of a node having a late time is corrected to increase. Thus, as the beacon interval increases, times of a plurality of nodes converge.

FIG. 8 is a flowchart illustrating a process of correcting time information of a node that receives a beacon signal according to an embodiment of the present invention.

Referring to FIG. 8, when a node receives beacon signals from neighboring nodes (step S800), the corresponding node decides whether a local averaging value exists at a previous beacon interval (step S802).

When the local averaging value does not exist at the previous beacon interval, the node determines a self-correcting value at the previous beacon interval as a self-correcting value at a current beacon interval (step S804).

For example, when the current beacon interval is an nth beacon interval, the self-correcting value at the previous beacon interval in step S804 may be a self-correcting value at an (n−1)th beacon interval, which may be a local averaging value calculated at the (n−1)th beacon interval.

Meanwhile, when it is decided in step S802 that the local averaging value exists at the previous beacon interval, the node determines the local averaging value as the self-correcting value at the current beacon interval (step S806).

According to the present invention, the self-correcting value at the current beacon interval is determined as the most lately calculated local averaging value.

The node determines the self-correcting value through the above-described process, and simultaneously calculates a local averaging value by using an averaging value of time information of neighboring nodes at the current beacon interval (step S808).

The node corrects its own time information by using the local averaging value and the self-correcting value, determined through the above-described process, and an initial time at the current beacon interval (step S810).

As described above, in the case of a node having an early time in the ad-hoc network, a local averaging value and a self-correcting value may be subtracted from the initial time at the current beacon interval. In the case of a node having a late time, a local averaging value and a self-correcting value may be added up to the initial time at the current beacon interval.

According to the present invention, a node transmitting a beacon signal determines, as a self-correcting value, a self-correcting value calculated using time information at a previous beacon interval or a local averaging value at the previous beacon interval, and transmits, to neighboring nodes, time information obtained by reflecting the determined self-correcting value to an initial time. Each of the neighboring nodes corrects its own time information through the process shown in FIG. 8.

Embodiments of the present invention may be implemented in a program command form capable of being performed through various computer means to be recorded in a computer-readable recording medium. The computer-readable recording medium may include a program command, a data file, a data structure, and the like separately or in a combination thereof. The program command recorded in the recording medium may be a command designed or configured specially for the present invention, or usably known to a person having ordinary skill in the computer software art. Examples of the computer-readable recording medium include magnetic media such as hard disks, floppy disks, and magnetic tapes, optical media such as CD-ROM and DVD, magneto-optical media such as floppy disks, and a hardware device such as ROM, RAM, and flash memory, which is configured to store and perform program commands. Examples of the program commands include a machine language code made by a compiler and a high-level language code implemented using an interpreter by a computer. The hardware device can be configured as at least one software module to perform the operation of embodiments of the present invention, and vice versa.

While the present invention has been described with respect to the specific embodiments, it will be apparent to those skilled in the art that various changes and modifications may be made without departing from the spirit and scope of the invention as defined in the following claims.

The invention claimed is:

1. A method for synchronizing, by a plurality of nodes included in an ad-hoc network, time information in the ad-hoc network, the method comprising:
transmitting, by a first node, time information corrected using an initial time and a first self-correcting value at an nth beacon interval, wherein the first self-correcting value is a local averaging value at a previous beacon interval; and
correcting, by a second node which has received the time information from the first node at the nth beacon interval, its own time information by calculating a second self-correcting value and a local averaging value, wherein
the local averaging value of the second node is an averaging value of time information of one or more neighboring node of the second node, and
the local averaging value of the second node is calculated according to the following Equation:

$$\Delta_i^{avg}(n) = \frac{\left(\left(\sum_{(j \in N(i,n))} \tilde{T}_j^{sc}(n)\right) + \tilde{T}_i^{sc}(n)\right)}{|N(i, n)| + 1},$$

where N is a number of neighboring nodes, i is an identifier of the second node, j is an identifier of a neighboring node, and $T^{SC}$ is a corrected time.

2. The method of claim 1, wherein, when the first node receives time information from one or more neighboring nodes at an (n+1)th beacon interval, the first node determines the first self-correcting value as a self-correcting value at the (n+1)th beacon interval, and corrects its own time information by using a local averaging value calculated using an averaging value of the time information received from the one or more neighboring nodes and the self-correcting value at the (n+1)th beacon interval.

3. The method of claim 1, wherein, when the second node transmits its own time information to the one or more neighboring nodes at the (n+1)th beacon interval, the second node corrects its own time information by using the local averaging value at the nth beacon interval as the self-correcting value at the (n+1)th beacon interval.

4. The method of claim 1, wherein, when an initial time of the second node is earlier than a time(s) of the one or more neighboring nodes, the second node corrects its own time information by subtracting the second self-correcting value and the local averaging value at the nth beacon interval from the initial time at the nth beacon interval.

5. The method of claim 1, wherein, when the initial time of the second node is later than the time(s) of the one or more neighboring nodes, the second node corrects its own time information by adding up the second self-correcting value and the local averaging value at the nth beacon interval to the initial time at the nth beacon interval.

6. A non-transitory recorded medium by a digital processing device, tangibly embodying program instructions executable by the digital processing device to perform the method of claim 1.

7. A method for synchronizing, by a plurality of nodes included in an ad-hoc network, time information in the ad-hoc network, the method comprising:
receiving, by a first node, a beacon signal including time information from one or more neighboring nodes at an nth beacon interval;
determining a local averaging value at a previous beacon interval as a self-correcting value at the nth beacon interval;
calculating a local averaging value at the nth beacon interval by using an averaging value of the time information of the one or more neighboring nodes; and
correcting its own time information by using the self-correcting value, the local averaging value at the nth beacon interval, and an initial time,
wherein the local averaging value is calculated according to the following Equation:

$$\Delta_i^{avg}(n) = \frac{\left(\left(\sum_{(j \in N(i,n))} \tilde{T}_j^{sc}(n)\right) + \tilde{T}_i^{sc}(n)\right)}{|N(i, n)| + 1},$$

where N is a number of neighboring nodes, i is an identifier of the second node, j is an identifier of a neighboring node, and $T^{SC}$ is a corrected time.

8. A method for synchronizing, by a plurality of nodes included in an ad-hoc network, time information in the ad-hoc network, the method comprising:

receiving, by a first node, a beacon signal including time information from one or more neighboring nodes at an nth beacon interval;

calculating a self-correcting value by using a difference between an initial time and a corrected time at a previous beacon interval;

calculating a local averaging value by using an averaging value of the time information of the one or more neighboring nodes; and correcting its own time information by using the self-correcting value, the local averaging value, and the initial time, wherein the local averaging value is calculated according to the following Equation:

$$\Delta_i^{avg}(n) = \frac{\left(\left(\sum_{(j \in N(i,n))} \tilde{T}_j^{sc}(n)\right) + \tilde{T}_i^{sc}(n)\right)}{|N(i, n)| + 1},$$

where N is a number of neighboring nodes, i is an identifier of the second node, j is an identifier of a neighboring node, and $T^{SC}$ is a corrected time.

9. A system for synchronizing time information in an ad-hoc network, the system comprising:

a first node configured to transmit time information corrected using an initial time and a first self-correcting value at an nth beacon interval, wherein the first self-correcting value is a local averaging value at a previous beacon interval; and a second node configured to correct its own time information by receiving the time information from the first node at the nth beacon interval and calculating a second self-correcting value and a local averaging value, wherein the first self-correcting value is one of a self-correcting value and a local averaging value, which are calculated at an (n−1)th beacon interval, the local averaging value of the second node is an averaging value of time information of one or more neighboring nodes of the second node, and the local averaging value of the second node is calculated according to the following Equation:

$$\Delta_i^{avg}(n) = \frac{\left(\left(\sum_{(j \in N(i,n))} \tilde{T}_j^{sc}(n)\right) + \tilde{T}_i^{sc}(n)\right)}{|N(i, n)| + 1},$$

where N is a number of neighboring nodes, i is an identifier of the second node, j is an identifier of a neighboring node, and $T^{SC}$ is a corrected time.

10. The system of claim 9, wherein, when the first node receives time information from one or more neighboring nodes at an (n+1)th beacon interval, the first node determines the first self-correcting value as a self-correcting value at the (n+1)th beacon interval, and corrects its own time information by using a local averaging value calculated using an averaging value of the time information received from the one or more neighboring nodes and the self-correcting value at the (n+1)th beacon interval.

11. The system of claim 9, wherein, when the second node transmits its own time information to the one or more neighboring nodes at the (n+1)th beacon interval, the second node correct its own time information by using the local averaging value at the nth beacon interval as the self-correcting value at the (n+1)th beacon interval.

* * * * *